(12) United States Patent
Milazar

(10) Patent No.: US 9,382,846 B2
(45) Date of Patent: Jul. 5, 2016

(54) SEALING ELEMENT FOR SEALING A GAP

(75) Inventor: Mirko Milazar, Oberhausen (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 671 days.

(21) Appl. No.: 13/809,417

(22) PCT Filed: Jul. 13, 2011

(86) PCT No.: PCT/EP2011/003495
§ 371 (c)(1),
(2), (4) Date: Mar. 20, 2013

(87) PCT Pub. No.: WO2012/007158
PCT Pub. Date: Jan. 19, 2012

(65) Prior Publication Data
US 2013/0207351 A1 Aug. 15, 2013

(30) Foreign Application Priority Data
Jul. 13, 2010 (EP) .................................. 10007222

(51) Int. Cl.
F02C 7/28 (2006.01)
F01D 11/00 (2006.01)

(52) U.S. Cl.
CPC ............... F02C 7/28 (2013.01); F01D 11/005 (2013.01)

(58) Field of Classification Search
CPC ....... F02C 7/28; F01D 11/005; F01D 11/006; F01D 11/008

USPC .......... 277/591, 643, 644, 648, 649; 415/135, 415/136, 138, 139
See application file for complete search history.

(56) References Cited

U.S. PATENT DOCUMENTS

| 4,541,775 | A  |   | 9/1985  | Hovan |
| 5,390,939 | A  | * | 2/1995  | Terauchi et al. ............... 277/650 |
| 5,975,844 | A  |   | 11/1999 | Lienert |
| 8,201,834 | B1 | * | 6/2012  | Liang ............................. 277/637 |
| 2003/0082049 | A1 |   | 5/2003  | Brisson et al. |
| 2004/0051254 | A1 | * | 3/2004  | Smed ............................. 277/628 |
| 2005/0173871 | A1 | * | 8/2005  | Paprotna et al. ............... 277/630 |

FOREIGN PATENT DOCUMENTS

| CN | 1395667 A | 2/2003 |
| CN | 1475656 A | 2/2004 |

(Continued)

Primary Examiner — Amber Anderson
Assistant Examiner — Stacy Warren

(57) ABSTRACT

A sealing element for sealing a gap between two components is provided. The sealing arrangement may be a seal arrangement of a gas turbine system, wherein the sealing element is elongate along a main line and has a contoured cross section in a corrugated center region. In cross section, the sealing element is directed along the main line and may be deformed in a direction substantially orthogonally with respect to the main line. In order to provide a wear-resistant, long-lasting sealing element with a particularly efficient blocking action, it is proposed that the seal teeth of the corrugation have a virtually rectangular cross-sectional contour, the tooth height of which seal teeth is between 10% and 40% of the sealing-element thickness which may be measured parallel to the tooth height.

2 Claims, 2 Drawing Sheets

(56) References Cited

FOREIGN PATENT DOCUMENTS

| | | |
|---|---|---|
| DE | 3730411 A1 | 4/1988 |
| EP | 0852659 A2 | 7/1998 |
| EP | 0852659 B1 | 4/2002 |
| GB | 215403 A | 5/1924 |
| GB | 935356 A | 8/1963 |
| GB | 2137283 A | 10/1984 |
| GB | 2195403 A | 4/1988 |
| GB | 2280935 A | 2/1995 |
| JP | 11511535 | 10/1999 |
| JP | 2002540336 A | 11/2002 |
| JP | 2005539171 A | 12/2005 |
| JP | 2008019860 A | 1/2008 |
| WO | WO 0155273 A2 | 8/2001 |

* cited by examiner

SEALING ELEMENT FOR SEALING A GAP

CROSS REFERENCE TO RELATED APPLICATIONS

This application is the US National Stage of International Application No. PCT/EP2011/003495, filed Jul. 13, 2011 and claims the benefit thereof. The International Application claims the benefits of European Patent Office application No. 10007222.2 EP filed Jul. 13, 2010. All of the applications are incorporated by reference herein in their entirety.

FIELD OF INVENTION

The invention relates to a sealing element for sealing a gap which is formed between two components which can be moved in relation to one another as a result of thermal action and each have a mutually opposite component groove. The invention also relates to such a sealing arrangement having a sealing element seated in the mutually opposite component grooves.

BACKGROUND OF INVENTION

In gas turbines, it is also the case, for example, that platforms of fixed turbine blades limit the annular flow path of the hot gas generated in the combustion chambers of the gas turbine. The platforms of adjacent turbine blades here are arranged one beside the other with gaps being formed therebetween. In order to prevent hot gas being lost through these gaps and, at the same time, thus to avoid damage to carrier components arranged on the rear, it is known for the gap to be sealed with the aid of a sealing element which is seated in two mutually opposite component grooves. Such a sealing arrangement is known from EP 0 852 659 B1. The plate-like sealing sheet known from this document has a toothed (ribbed) surface on one side.

It has been found that the sealing sheets configured in this way can undergo pronounced wear, for example, in the case of components which can be moved to a pronounced extent in relation to one another as a result of thermal action. Accordingly, the necessary sealing function may be impaired and the operational capability of the system may be restricted to a considerable extent. Furthermore, it is also possible for problems to arise in the installation of the known sealing sheets, it being possible for these problems to give rise to undesired follow-up work.

SUMMARY OF INVENTION

It is therefore an object of the invention to specify a long-life sealing element which is intended for sealing a gap and ensure effective sealing even in the case of comparatively large heat-induced component movements.

The object is achieved according to the invention by a sealing element for sealing a gap between two components which can be moved in relation to one another as a result of thermal action and each have a mutually opposite component groove for accommodating the sealing element, which is directed along a main line and, as seen in a cross section essentially perpendicular to the main line, has a central region which is arranged between a first end and a second end and has a first surface which is toothed, in that the sealing teeth, preferably all the sealing teeth, have essentially a rectangular cross-sectional contour and the tooth height thereof is between 10% and 40% of the sealing-element thickness which can be detected parallel to the tooth height, i.e. including the tooth height.

The invention proceeds from the finding that the known sealing sheet has a toothing formation of which the tooth height was too large in relation to the overall thickness of the sealing sheet. The tooth-carrier portion of the sealing sheet, on which the sealing teeth are arranged, thus had an only insufficient material thickness, and therefore wear could weaken the previously relatively thin tooth-carrier portion of the sealing sheets to an inadmissibly pronounced extent. To this extent, under increased mechanical stressing on account of comparatively large displacements of the mutually opposite components, only a comparatively small amount of wear material remained in the tooth-carrier portion of the sealing sheet. On account of the comparatively thin tooth-carrier portion, it was possible, with corresponding thermal movements of the components, for the latter to be subjected to premature local wear. This could have led to partial failure of the known sealing sheet. According to the invention, the tooth height, then, is limited in relation to the overall sealing-element thickness and is between 10% and 40% of the sealing-element thickness. This means that the tooth-carrier portion of the sealing element according to the invention is significantly thicker than in the case of the prior-art sealing sheet, which results in increased long-term strength and service life of the sealing element.

In contrast to the cross-sectionally tapering sealing teeth of the sealing element which is known from the prior art, the sealing teeth according to the invention have a more or less rectangular cross-sectional contour, with the exception of a transition region to the tooth-carrier portion. Accordingly, the sealing element according to the invention, then, has sealing teeth of which the tooth flanks are steeper than in the case of the closest prior art. It is also the case that the sealing teeth are significantly narrower than hitherto. On account of the steeper tooth flanks and the narrower design, the sealing element has improved deformability (compliance) in the ribbed region, which allows straightforward installation of the plate-like sealing element in the component grooves. If, however, wear should occur, then this occurs in the first instance at the novel teeth and only then in the tooth-carrier portion. This delays the partial failure of the sealing element.

Therefore, the sealing element according to the invention differs from the known sealing sheet in that the carrier portion of the sealing element according to the invention is stiffer than in the case of the known sealing sheet and the ribbed region of the sealing element according to the invention is softer than in the case of the known sealing element. In this respect, the stiffer and softer regions have consequently been changed over.

Advantageous configurations of the invention are specified in the dependent claims.

Furthermore, the sealing element, irrespective of its relative tooth height, displays an improved sealing action if the sealing teeth have a rectangular cross-sectional contour and the spacing apart thereof is reduced approximately to 1.6 times the tooth height of the sealing teeth. Accordingly, an optimum spacing is set between the adjacent teeth and optimum gap restriction is achieved, and therefore improved sealing action is ensured in relation to the known configuration.

The sealing-element thickness is expediently between 1.0 mm and 4.0 mm and the tooth height (H) of the sealing element is expediently between 0.1 mm and 1.6 mm, in particular between 0.3 mm and 0.7 mm.

The sealing teeth of the sealing element preferably have particular adaptability in the form of improved deformability, and therefore straightforward installation of the sealing elements can still be ensured even if the sealing elements are oversized. This adaptability is based on the steeper tooth flanks and narrower sealing teeth, in comparison with those from the prior art.

Moreover, the sealing element has a particular level of compliance in respect of increased offsetting and deformation of the adjacent components, and therefore the sealing element is also particularly suitable for sealing components exhibiting considerable offsetting and deformation during operation.

BRIEF DESCRIPTION OF THE DRAWINGS

The above described invention will be explained in more detail with reference to the following description of the figures, in which.

DETAILED DESCRIPTION OF INVENTION

Figure 1:
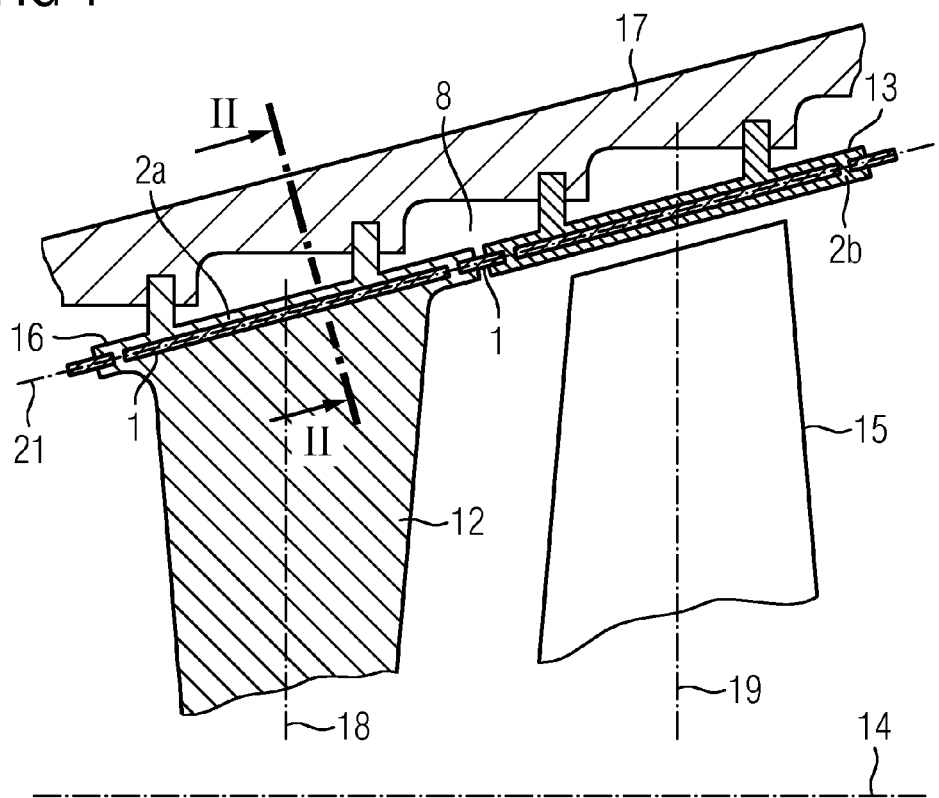
FIG. 1 shows part of a longitudinal section through a gas-turbine installation and FIG. 2 shows the cross section through a sealing arrangement of a gas-turbine installation having a sealing element.

FIG. 1 illustrates a gas-turbine installation 22 directed along a main axis 14. This gas-turbine installation has fixed blades 12 and moving blades 15 alternating in the axial direction in a housing 17. The moving blades 12 are directed along an axis 18 perpendicular to the main axis 14 and are arranged along the circumference of the gas-turbine installation 22 to form a circle. The fixed blades 12 are connected to the housing 17 of the gas-turbine installation 22 via a respective fixed-blade plate 16. Along the circumference, adjacent fixed plates 12 are spaced apart from one another by a respective gap 5 (see FIG. 2), as a result of which they can expand largely freely as a result of thermal action.

The fixed-blade plate 16 separates a hot-gas region 11, which is formed around the main axis 14 of the gas-turbine installation 22, from a cooling-gas region 8, which is formed between the fixed-blade plate 16 and the turbine housing 17. The moving blades 15 extend along a respective main axis 19, which is likewise essentially orthogonal to the main axis 14 of the gas-turbine installation. The moving blades 15 are located entirely within the hot-gas region 11. This hot-gas region 11 is separated from the cooling-air region 8 along the circumference of the gas-turbine installation 22 by a plurality of wall components 13. The wall components 13 here are each adjacent to the moving blades 15. The wall components 13 are connected to the turbine housing 17. For the sake of clarity, in each case just one fixed blade 12, one moving blade 15 and one wall component 13 have been illustrated. As seen in the axial direction, a respective wall component 13 is spaced apart by a gap 5 from a respective fixed blade 12, in particular the fixed-blade plate 16. This gap 5 is sealed by a sealing element 1 as a result of which largely a flow of cooling gas out of the cooling-air region 8 into the hot-gas region 11 is prevented. The fixed blade 12 here constitutes a first component 2a and the wall part 13 constitutes a second component 2b. As seen in the axial direction, the cooling-air region 8 is sealed from the hot-gas region 11 by fixed-blade plates 16 and wall components 13 and, as seen in the circumferential direction, sealing takes place in each case between adjacent fixed blades 12 and between correspondingly adjacent wall components 13.

Figure 2:
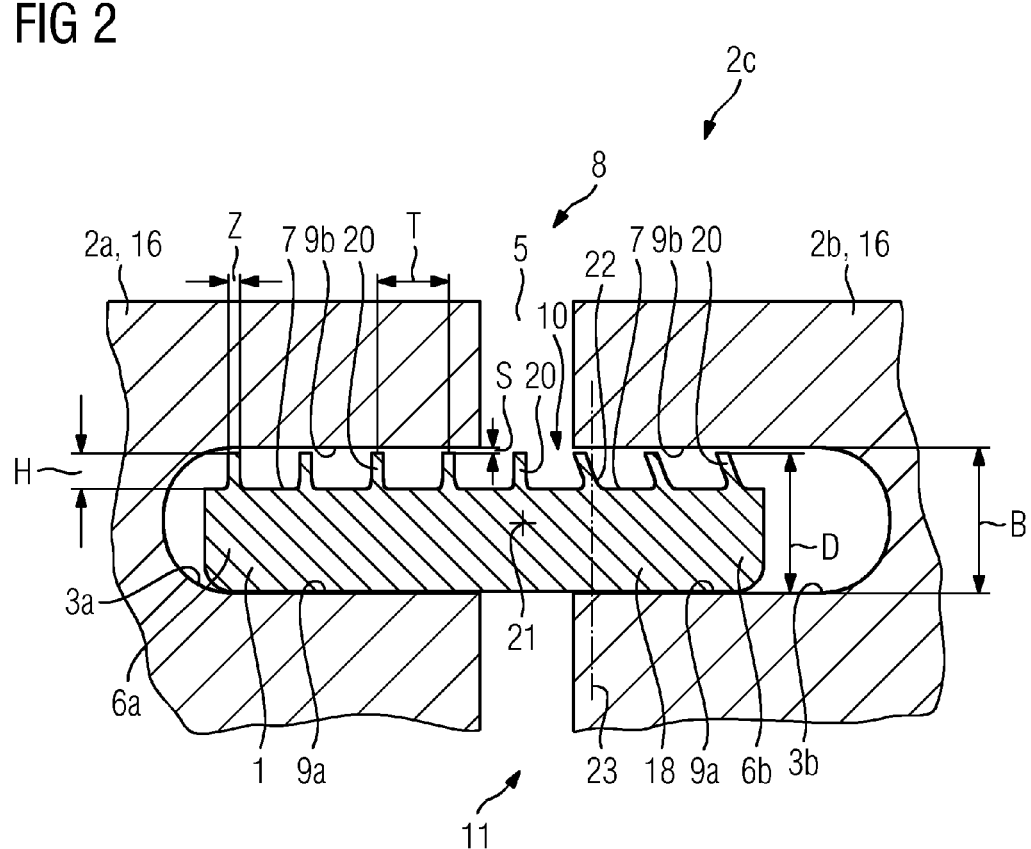

FIG. 2 shows a section, taken along the circumference of the gas-turbine installation 22, through two adjacent components 2a, 2b. The two components 2a, 2b are part of a sealing arrangement 2c and are spaced apart from one another by a gap 5. The components 2a, 2b may each be two adjacent fixed blades 12, in particular fixed-blade plates 16 and two adjacent wall components 13. As seen in the circumferential direction in each case, a component groove 3a, 3b is provided in the components 2a, 2b, respectively. A sealing element 1 engages in the component grooves 3a, 3b to seal the gap 5. The sealing element 1 is directed along a main line 21 and has, in the cross section illustrated, in a direction perpendicular to the main line 21, a first end 6a, a second end 6b and a central region 10 located therebetween. The central region 10 has a plurality of ribbing grooves 7 directed toward the cooling-gas region 8, wherein a respective sealing tooth 20 is formed between adjacent ribbing grooves 7, as a result of which the central region 10 is ribbed on one side. The sealing teeth 20 are arranged on a tooth-carrier portion 18 of the sealing element 1. Each ribbing groove 7 and each sealing tooth 20 extends parallel to the main line 21 and perpendicularly to a possible leakage flow.

The component grooves 3a, 3b each have groove side walls 9a, 9b each located opposite, and parallel, to one another. Since usually the pressure of the cooling gas is higher than the pressure of the hot gas in the hot-gas-channeling region 11, the sealing element 1 has its smooth surface resting on the side walls 9a of the component grooves 3a, 3b, and therefore the sealing teeth 20 are rather relieved of mechanical loading.

The two groove side walls 9a, 9b of a component groove 3a, 3b here are located opposite one another by a spacing which is also designated as groove width B. The groove width B is, at most, 1.1 times greater than the overall thickness D of the sealing element 1. According to a first configuration, the groove width is 2.5 mm and the sealing-element thickness is 2.4 mm.

The sealing teeth 20 have a height H which is between 10% and 40% of the sealing-element thickness, for example 0.5 mm. This corresponds approximately to 20.8% of the aforementioned sealing-element thickness. At the same time, on account of their more or less rectangular cross-sectional contour, the sealing teeth 20 have a tooth width Z which is more or less unchanged over their height. This tooth width Z is in the order of magnitude of approximately 0.1 to 0.2 mm. The overall thickness D of the sealing element 1 and the groove width B are coordinated with one another such that—with planar abutment of the smooth side of the sealing element 1 against the groove side wall 9a, a gap S forms between the sealing-tooth tip and the other side wall 9b of the component groove 3a, 3b—the average spacing T between two directly adjacent sealing teeth 20 is at least five times the gap S. If possible, the average spacing T should also be essentially 1.6 times the tooth height H. According to the first configuration of the sealing arrangement 2c, the gap S has an extent of 0.1 mm and the spacing T has an extent of 0.8 mm.

Of course, sealing teeth 20 need not project perpendicularly from the tooth-carrier portion 18. It is also possible, on the right-hand side, and designated 22, in FIG. 2, for them to be inclined slightly in relation to a perpendicular 23 to the tooth-carrier portion 18.

Overall, the invention relates to a sealing element 1 which is intended for sealing a gap 5 between two components 2a, 2b, in particular a sealing arrangement 2c of a gas-turbine installation, and extends along a main line 21 and has a contoured cross section in a ribbed central region 10. As seen in cross section, the sealing element 1 is directed along the main line 21 and can be deformed in a direction essentially orthogonal to the main line 21. In order to provide a wear-resistant, long-life sealing element 1 with particularly efficient blocking action, it is proposed that the sealing teeth 20 of the ribbing formation have a rectangular cross-sectional contour and the tooth height H thereof is between 10% and 40% of the sealing-element thickness D which can be detected parallel to the tooth height H. Sealing which is just as efficient can be achieved if, instead, the sealing teeth 20, alongside the rectangular cross-sectional contour, are spaced apart from one another by a spacing T which is approximately 1.6 times the average tooth height H of the relevant sealing teeth 20. The average tooth height H corresponds to the arithmetic mean of the tooth heights in question.

The invention claimed is:

1. A plate-like sealing element for sealing a gap between two components, the sealing element comprising:
    a central region;
    a first end;
    a second end; and
    a first surface,
    wherein the two components may be moved in relation to one another as a result of mechanical or thermal action and each have a mutually opposite component groove for accommodating the sealing element,
    wherein the sealing element is directed along a main line and, as seen in a cross section essentially perpendicular to the main line,
    wherein the central region is arranged between the first end and the second end,
    wherein the first surface is toothed comprising sealing teeth,
    wherein all the sealing teeth have an essentially rectangular cross-sectional contour and the tooth height thereof is between 10% and 40% of a thickness of the sealing element, and
    wherein the thickness of the sealing element is measured parallel to the tooth height and includes the tooth height,
    wherein a spacing between two directly adjacent sealing teeth is 1.6 times the average tooth height of the two sealing teeth, and
    wherein the thickness of the sealing element is between 1.0 mm and 4.0 mm, and
    wherein the tooth height is between 0.1 mm and 1.6 mm.

2. The sealing element as claimed in claim 1,
    wherein the tooth height is between 0.3 mm and 0.7 mm.

* * * * *